United States Patent [19]

Hirano

[11] Patent Number: 4,661,796
[45] Date of Patent: Apr. 28, 1987

[54] NORMAL AND ABNORMAL CONDITION INDICATING DEVICE

[75] Inventor: Kazuo Hirano, Osaka, Japan

[73] Assignee: Sumitomo Electric Industries, Ltd., Osaka, Japan

[21] Appl. No.: 586,851

[22] Filed: Mar. 5, 1984

[30] Foreign Application Priority Data

May 10, 1983 [JP] Japan ............................. 58-68513[U]

[51] Int. Cl.⁴ .............................................. B60Q 1/00
[52] U.S. Cl. ......................................... 340/85; 340/66; 307/10 LS
[58] Field of Search ...................... 340/85, 52 F, 52 R, 340/79, 614, 84, 81 R, 66; 307/10 LS, 10 R; 315/83, 84; 362/71

[56] References Cited

U.S. PATENT DOCUMENTS

| | | | |
|---|---|---|---|
| 3,523,288 | 8/1970 | Thompson | 340/648 |
| 3,541,504 | 11/1970 | Bush | 340/641 X |
| 4,024,496 | 5/1977 | Stover | 307/10 AT |
| 4,051,383 | 9/1977 | Dola | 307/10 LS X |
| 4,105,996 | 8/1978 | Shimizu | 340/73 |

Primary Examiner—James L. Rowland
Assistant Examiner—Jeffery A. Hofsass
Attorney, Agent, or Firm—Ernest A. Beutler

[57] ABSTRACT

A warning device for an automobile having a number of lights that are illuminated in response to opening of a compartment in which the light is positioned, such as an engine compartment trouble light, interior courtesy lights and/or a trunk light. In accordance with the invention, each light is served by a conductor that is contained within a wire harness. An arrangement is provided wherein the illuminated condition of the light is changed in response to a failure condition of a device served by the same wire harness so as to provide a simplified warning system.

15 Claims, 1 Drawing Figure

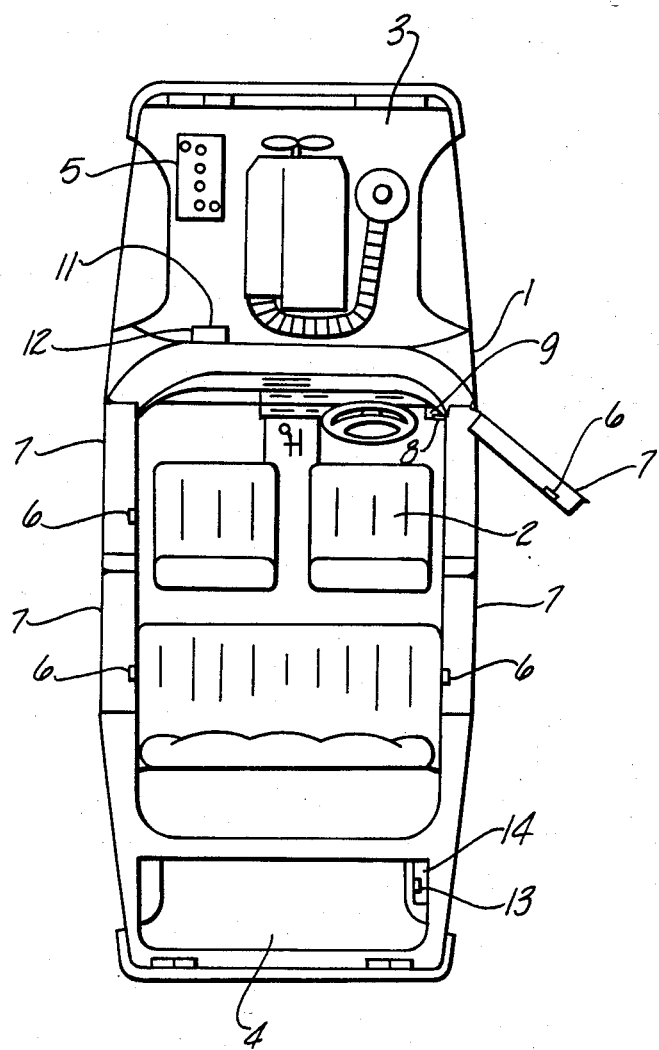

NORMAL AND ABNORMAL CONDITION INDICATING DEVICE

BACKGROUND OF THE INVENTION

This invention relates to a normal and abnormal condition indicating device and more particularly to an improved and simplified warning arrangement for a vehicle such as an automobile.

The use of electrical and electronic components in vehicles such as automobiles has been increasing significantly in recent years. Functions performed previously by mechanical devices are, oftentimes, now achieved electrically. Many of the electrically operated devices include electromagnetic relays, control circuits including electronic circuits and data processing units. Furthermore, many of the devices are automatically controlled and thus employ also detector circuits. The growing electrical complexity of automobiles has created a demand for failure indicating devices. It has been proposed, in many automobiles, to use a variety of failure indicators that are displayed on the instrument panel so that the operator may immediately discern a malfunction. However, the extremely complex nature of the various electrical circuits in an automobile make it difficult to provide meaningful dashboard indication of all situations. That is, the number of circuits which should be monitored are so great in number that it would be impossible for an operator to discern all of the possible failures from dashboard indicators.

In addition to these problems in connection with dashboard failure indicators, the use of an indicator on the dashboard to indicate each electrical malfunction still further adds to the complexity of the electrical system since wires must be provided to convey the signal to an indicator located on the dashboard.

It is, therefore, a principal object of this invention to provide an improved and simplified failure indicating device.

It is another object of this invention to provide an improved and simplified failure indicating system for an automobile.

SUMMARY OF THE INVENTION

A first feature of this invention is adapted to be embodied in a fault indicating system that comprises a light and means for illuminating the light in response to a predetermined normal condition. In accordance with this feature of the invention, means are provided for illuminating the light in response to a failure.

Another feature of this invention is adapted to be embodied in a fault indicating system for a vehicle or the like having a plurality of electrically controlled devices and a wire harness containing a plurality of wires, each for supplying power to a respective of the electrically controlled devices. In accordance with this feature of the invention, means are provided for giving a fault signal in the event of an electrical failure of any of the electrically controlled devices supplied with power from the wire harness.

BRIEF DESCRIPTION OF THE DRAWINGS

The single FIGURE of the drawings is a partially schematic, top plan view of an automobile constructed in accordance with the invention, with certain portions removed to more clearly show the construction.

DETAILED DESCRIPTION OF THE PREFERRED EMBODIMENT

An automobile constructed in accordance with the invention is identified generally by the reference numeral 1. The automobile 1 includes a body that defines a passenger compartment 2, an engine compartment 3 and a trunk 4. The automobile 1 includes a storage battery 5 that is positioned within the engine compartment 3 and which supplies electrical power to various components of the vehicle as is well known in this art. Because the means of powering the various electrical components and the specific components so powered is well within the knowledge of those skilled in the art, these components have not been illustrated in detail.

Courtesy lights 6 are provided on each of the doors 7 of the automobile 1. As is well known, the courtesy lights 6 are illuminated upon opening of the doors 7. Additionally, a manually operated switch may be provided on the dashboard or at another location for illuminating such courtesy lights. A further courtesy light 8 may be positioned adjacent the driver's side of the vehicle and is conveniently supported and supplied with power from an electrical connector which is formed at one end of one of the wire harnesses of the automobile 1. Of course, such a wire harness will carry a number of wires that supply power to various electrical components of the vehicle 1 including the courtesy light 8. The connector is indicated by the reference numeral 9 and may take the form of any of the well known connectors used for this purpose. However, the connector 9 is provided with a socket for also receiving the courtesy light 8.

An engine compartment or trouble light 11 is positioned within the engine compartment 3 and may be illuminated in response to opening of the hood (not shown) in a known manner. The trouble light 11 is supported by a socket that is contained within a connector 12 of a further wire harness. The trouble light 11 is opened in response to opening of the hood by means of a suitable sensing device, which may be contained with the wire connector 12. For that reason, the connector 12 may be supported by the hood and movable with it so that the sensing device will sense the condition (open or closed) of the hood.

A trunk light 13 is positioned in the trunk 4 and is also supported by a socket in a connector 14 of a still further wire harness. The light 13 is illuminated, in a known manner, in response to opening of the lid of the trunk 4, which has been deleted in the drawings to show the interior construction. For this purpose, a sensing device may be located within the wire harness connector 14 and this connector can be mounted on the trunk lid.

The courtesy lights 6 and 8, trouble light 11 and trunk light 13 are all operated by suitable control relays that are positioned within the respective wire harness connectors 9, 12 and 14. The sensing units that operate these relays may, as noted, also be located in these connections. The connectors 9, 12 and 14 are each associated with wire harnesses that contain a number of wires that supply power to a variety of electrical controlled devices. If desired, suitable electrical relays and control units for these other devices may also be located in the wire harness connectors 9, 12 and 14.

In connection with the lights 8, 11 and 13, they have been described as being connected to sockets that form a part of the respective wire connectors 9, 12 and 14. Of course, these lights may be positioned separately of the respective wiring harness connectors 9, 12 and 14. However, by mounting them directly upon the wire harness connectors, the use of additional wires can be eliminated.

The control unit for the courtesy lights 6 and 8, which is located in the wire harness connector 9, as aforenoted, is also designed so as to sense the failure of any other device supplied with power from the wire harness of which the connector 9 is a part. Thus, the lights 6 and 8 will be illuminated not only when one of the doors 7 is opened, but when one of these other devices fails. Hence, the lights 6 and 8 will be illuminated in response to a normal condition and also will be illuminated in response to an abnormal or failure condition. The other devices supplied by the wire harness of which the connector 9 is a part may be such devices as the radio, windshield wipers, dome lights or other devices which are normally supplied in the interior of a vehicle. Additionally, the control may be actuated to illuminate the lights 6 and 8 in the event of blowing of the fuse in the circuits for any of these other devices. Therefore, the operator of the vehicle 1 will be readily warned of a failure in one of the electrical circuits when operating the vehicle by illumination of the lights 6 and 8. He may immediately rectify the problem. Rather than turning the lights 6 and 8 on continuously, the control device may illuminate these lights for a brief period of time or may intermittently flash them in the event of a failure in any of the circuits being sensed.

In a similar manner, the control devices for the trouble light 11 and trunk light 13, which are also located in the wire harness connectors 12 and 14, respectively, will illuminate these respective lights when either the hood or trunk is opened. The failure sensing arrangements with the connectors 12 and 14, therefore, are operative to periodically cause the lights 11 or 13 to go out and then be reilluminated when either the hood or trunk is open and there is a failure in one of the devices supplied with power from the wire harness with which the respective connector 12 and 14 is associated. Thus, a failure indication will be given with these devices.

It should be readily apparent from the foregoing description that this invention provides an arrangement wherein there is a simple and yet highly effective failure indicator for the devices of a wire harness group. This provides good safety and yet affords a very simple and low cost failure indicating device. Although certain embodiments of the invention have been illustrated and described, it should be readily apparent that various changes and modifications may be made, without departing from the spirit and scope of the invention, as defined by the appended claims.

I claim:

1. A fault indicating system comprising a light, means including an electric light circuit for illuminating said light in response to a predetermined normal condition, another circuit for operating an electrical device other than said light and means for illuminating said light in response to a failure in said other circuit and in the absence of said normal condition.

2. A fault indicating system comprising a light, means including an electric circuit for illuminating said light in response to a predetermined normal condition, and means for changing the illuminated condition of said light in response to a failure in a circuit other than said light circuit, said light being provided with current from a connector which connector is contained within a wire harness having a group of other conductors for providing electrical power to other devices than said light, the means for changing the illuminated condition of the light being responsive to a failure in any of the devices suppied by the conductors of said wire harness and in the absence of said normal condition.

3. A fault indicating system as set forth in claim 2 wherein the wire harness terminates in a connector adapted to provide an electrical connection with a mating connector.

4. A fault indicating system as set forth in claim 3 wherein the light is supported in a socket contained within the connector.

5. A fault indicating system for a vehicle having a plurality of electrical circuits, an interior light for an interior compartment of said vehicle illuminated in response to opening of the compartment and supplied with current from one of said circuits, said other circuits powering electrical devices other than said light, and means for changing the illumination of said interior light in response to a failure in another one of said ciruits and regardless of the opening condition of said compartment.

6. A fault indicating system as set forth in claim 5 wherein there are a plurality of lights each for a respective compartment of the vehicle and each illuminated in response to opening of the respective compartment and each being adapted to contain means for changing the illuminated condition of the light in response to a failure.

7. A fault indicating system as set forth in claim 6 wherein each light is provided with a conductor that is contained within a wire harness having a group of other conductors each of which supplies power to another electrically controlled device.

8. A fault indicating system as set forth in claim 7 wherein each wire harness terminates in a respective connector adapted to provide an electrical connection with a mating connector.

9. A fault indicating system as set forth in claim 8 wherein the light is supported in a socket contained within the connector.

10. A fault indicating system as set forth in claim 5 wherein the light is contained within a trunk of the vehicle and is illuminated in response to opening of the trunk.

11. A fault indicating system as set forth claim 10 wherein the trunk light is provided with current from a conductor that is contained within a wire harness having a group of other conductors supplying electrical power to other electrically operated devices, said wire harness terminating in a conector adapted to be connected to a mating connector of the vehicle.

12. A fault indicating system as set forth in claim 11 wherein the light is supported in a socket contained within the connector.

13. A fault indicating system as set forth in claim 5 wherein the light is a courtesy light contained within the interior of the vehicle and illuminated in response to opening of a door of the vehicle.

14. A fault indicating system as set forth in claim 13 wherein the trunk light is provided with current from a conductor that is contained within a wire harness having a group of other conductors supplying electrical power to other electrically operated devices, said wire harness terminating in a connector adapted to be connected to a mating connector of the vehicle.

15. A fault indicating system as set forth in claim 14 wherein the light is supported in a socket contained within the connector.

* * * * *

UNITED STATES PATENT AND TRADEMARK OFFICE
CERTIFICATE OF CORRECTION

PATENT NO. : 4,661,796

DATED : April 28, 1987

INVENTOR(S) : Kazuo Hirano

It is certified that error appears in the above-identified patent and that said Letters Patent is hereby corrected as shown below:

Column 4, line 49, Claim 11, "conector" should be --connector--.

Signed and Sealed this

Twenty-fifth Day of December, 1990

Attest:

HARRY F. MANBECK, JR.

*Attesting Officer*    Commissioner of Patents and Trademarks